(12) United States Patent
Hirakawa et al.

(10) Patent No.: US 9,695,850 B2
(45) Date of Patent: Jul. 4, 2017

(54) WATERTIGHT CLIP

(71) Applicant: DAIWA KASEI KOGYO KABUSHIKI KAISHA, Aichi-ken (JP)

(72) Inventors: Katsuya Hirakawa, Toyokawa (JP); Osamu Asai, Okazaki (JP); Norihito Itou, Okazaki (JP)

(73) Assignee: DAIWA KASEI KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/470,808

(22) Filed: Aug. 27, 2014

(65) Prior Publication Data

US 2015/0059133 A1 Mar. 5, 2015

(30) Foreign Application Priority Data

Aug. 29, 2013 (JP) .................................. 2013-177832

(51) Int. Cl.
*F16B 2/20* (2006.01)
*F16B 5/06* (2006.01)
*B60R 13/02* (2006.01)
*F16B 21/08* (2006.01)
*B60R 11/00* (2006.01)

(52) U.S. Cl.
CPC ............ *F16B 2/20* (2013.01); *B60R 13/0206* (2013.01); *F16B 5/06* (2013.01); *F16B 5/0621* (2013.01); *F16B 21/086* (2013.01); *B60R 2011/0059* (2013.01); *Y10T 24/309* (2015.01); *Y10T 24/44026* (2015.01)

(58) Field of Classification Search
CPC .......... F16B 21/086; F16B 5/065; F16B 2/20; F16B 5/06; B60R 13/0206; Y10T 24/45597; Y10T 24/42; Y10T 24/44026; Y10T 24/303
USPC ........... 24/292, 453; 411/508, 509; 248/27.3
See application file for complete search history.

(56) References Cited

U.S. PATENT DOCUMENTS 2,981,991 A * 5/1961 Scott ......................... F16B 5/06
24/458
4,521,148 A * 6/1985 Tanaka .......................... 411/182
4,762,437 A * 8/1988 Mitomi ......................... 403/11
(Continued)

FOREIGN PATENT DOCUMENTS

DE 195 19 623 A1 12/1996
DE 200 13 100 U1 10/2000
(Continued)

*Primary Examiner* — Robert J Sandy
*Assistant Examiner* — Rowland Do
(74) *Attorney, Agent, or Firm* — Christensen, Fonder, Dardi & Herbert PLLC

(57) ABSTRACT

A watertight clip may include a watertight clip main body and a packing. The watertight clip main body has a stabilizer, a pillar extending from the stabilizer, engagement legs formed in the pillar, and a packing retainer member. When the pillar is inserted into an attaching hole formed in a plate-shaped subject member, the subject member is positioned between the engagement legs and the stabilizer, so that an attached member connected to the stabilizer can be attached to the subject member. The packing is previously attached to the pillar. The packing is interleaved between the subject member and the stabilizer. The packing retainer member is configured to prevent the packing from separating from the pillar.

7 Claims, 5 Drawing Sheets

(56) References Cited

U.S. PATENT DOCUMENTS

| | | | | |
|---|---|---|---|---|
| 4,927,306 | A * | 5/1990 | Sato | 411/182 |
| 5,592,720 | A * | 1/1997 | Sasakawa et al. | 24/453 |
| 5,795,118 | A * | 8/1998 | Osada et al. | 411/171 |
| 7,019,215 | B2 * | 3/2006 | Arai | 174/72 A |
| 7,594,629 | B2 * | 9/2009 | Smutny et al. | 248/71 |
| 7,669,807 | B2 * | 3/2010 | Stigler et al. | 248/71 |
| 2008/0141501 | A1 * | 6/2008 | Kuroda | F16B 21/086 24/297 |
| 2012/0155985 | A1 * | 6/2012 | Ruckel | F16B 37/0842 411/301 |
| 2012/0192386 | A1 * | 8/2012 | Asai | 24/458 |

FOREIGN PATENT DOCUMENTS

| | | |
|---|---|---|
| EP | 1 403 533 A1 | 3/2004 |
| JP | 63-54559 U | 4/1988 |
| JP | 5-94516 U | 12/1993 |
| JP | 2000-193090 A | 7/2000 |
| JP | 2003-72559 A | 3/2003 |
| JP | 2010-121773 A | 6/2010 |
| JP | 2010-266011 A | 11/2010 |
| JP | 2013-130233 A | 7/2013 |

* cited by examiner

WATERTIGHT CLIP

BACKGROUND OF THE INVENTION

Field of the Invention

Certain embodiments of the present invention relates to a watertight (sealing) clip. More particularly, certain embodiments of the present invention relates to a watertight clip having a packing and configured to be attached to an attaching hole formed in a subject member (e.g. a vehicle body panel) while the packing contacts the subject member around the attaching hole.

Description of Related Art

The type of watertight clip shown in FIGS. 5 and 6 is already known. A known watertight clip 101 is composed of a watertight clip body 102 and a polyurethane packing 103. The watertight clip body 102 has an anchor 110 and an attached article retainer portion 120 having an elongated plate-shape. The anchor 110 is composed of a pillar 114, a pair of cantilevered elastic engagement legs 116 and a dish-shaped stabilizer 112. The engagement legs 116 are formed on opposite sides of the pillar 114 and respectively have stepped end surfaces 116a. Further, the engagement legs 116 are capable of being oppositely flexed inward and outward with respect to the pillar 114. The stabilizer 112 is integrally formed in a proximal end of the pillar 114 of the anchor 110 so as to surround the pillar 114. The attached article retainer portion 120 is integrated with the stabilizer 112. Conversely, the packing 103 has a shape substantially corresponding to the stabilizer 112 and has a through bore 140 that is engageable with the pillar 114.

In order to attach a wiring harness (an attached article) (not shown) to a thin plate such as a vehicle body panel (a subject member) (not shown), as shown in FIG. 6, the pillar 114 of the anchor 110 is introduced into the through bore 140 of the packing 103 while expanding the through bore 140 by the engagement legs 116 until the stepped end surfaces 116a of the engagement legs 116 engages a periphery of the through bore 140. Thus, the packing 103 is combined with the watertight clip body 102 while the packing 103 is seated on the stabilizer 112 so that the watertight clip 101 can be formed. Thereafter, the wiring harness is connected to the attached article retainer portion 120 using a binding tape (not shown), so that the watertight clip 101 can be integrated with the wiring harness.

Subsequently, the pillar 114 of the anchor 110 is pushed into an attaching hole (not shown) formed in the thin plate. When the pillar 114 is inserted into the attaching hole, the engagement legs 116 can be introduced into the attaching hole while being respectively oppositely flexed toward a central axis of the anchor 110. When the pillar 114 is further inserted into the attaching hole, the stepped end surfaces 116a of the engagement legs 116 respectively engage a periphery of the attaching hole while the thin plate is positioned between the stepped end surfaces 116a of the engagement legs 116 and the stabilizer 112. Thus, the watertight clip 101 (the watertight clip body 102 and the packing 103) can be connected to the thin plate. As a result, the wiring harness may be attached to the thin plate via the watertight clip 101. Further, as described above, the packing 103 is attached to the anchor 110 while it is seated on the stabilizer 112. Therefore, when the clip 101 is connected to the thin plate, the packing 103 can be interleaved between the thin plate and the stabilizer 112.

Further, when the stepped end surfaces 116a of the engagement legs 116 engage the periphery of the attaching hole, the packing 103 can be compressed between the thin plate and the stabilizer 112. As a result, when the watertight clip 101 is attached to the thin plate, the attaching hole of the thin plate can be sealed or closed with water-tightness by the packing 103. That is, the watertight clip 101 may create a watertight seal around the attaching hole of the thin plate. Thus, the watertight clip 101 may perform a watertight function around the attaching hole. Therefore, in a condition in which the wiring harness is attached to the thin plate using the watertight clip 101, water (rainwater), dust or other such material can be prevented from entering an interior side of the thin plate through the attaching hole.

However, in the known watertight clip 101, the packing 103 is attached to the watertight clip body 102 by simply engaging the periphery of the through bore 140 with the stepped end surfaces 116a of the engagement legs 116 in. Therefore, the packing 103 can be relatively easily separated from or come off of the pillar 114 of the anchor 110 (the watertight clip body 102). This may lead to handling difficulty of the watertight clip 101.

Thus, there is a need in the art for improved watertight clips.

SUMMARY OF THE INVENTION

For example, in one aspect of the present invention, a watertight clip may include a watertight clip main body and a packing. The watertight clip main body has a stabilizer, a pillar extending from the stabilizer, engagement legs formed in the pillar, and a packing retainer member. When the pillar is inserted into an attaching hole formed in a plate-shaped subject member, the subject member is positioned between the engagement legs and the stabilizer, so that an attached member connected to the stabilizer can be attached to the subject member. The packing is previously attached to the pillar. The packing is interleaved between the subject member and the stabilizer, so as to perform a watertight function around the attaching hole. The packing retainer member is configured to prevent the packing from separating from the pillar.

According to one aspect of the invention, the packing can remain attached to the pillar due to the packing retainer member even when an external force is applied thereto in a direction in which the packing is pulled out of the pillar before the clip is used.

In another aspect of the present invention, the packing retainer member may include ribs respectively formed in the engagement legs. The ribs are shaped such that rotational trajectories of the ribs due to the flexure of the engagement legs do not interfere with a circumferential periphery of the attaching hole when the pillar is inserted into the attaching hole.

According to this aspect, an insertion load of the pillar into the attaching hole cannot be increased.

In a further aspect of the present invention, the packing retainer member may include engagement strips formed in the pillar. The pillar has depressed portions in which the engagement strips can be retracted. The engagement strips are configured to be flexed inward with respect to the pillar. The engagement strips are configured to be retracted in the depressed portions when the subject member is positioned between the engagement legs and the stabilizer.

In this aspect of the invention, when the subject member is positioned between the engagement legs and the stabilizer, the watertight function of the packing cannot be inhibited by the engagement strips.

Additional objects, features and advantages of the present invention will be readily understood after reading the following detailed description together with the accompanying drawings and the claims.

DETAILED DESCRIPTION OF THE INVENTION

A detailed representative embodiment of the present invention will be described with reference to FIGS. 1 to 4.

A representative watertight clip 1 (which will be hereinafter simply referred to as a clip 1) is shown in FIGS. 1 to 4. The clip 1 is intended to attach a wiring harness W (FIGS. 2 and 4) as an attached member to a thin plate 30 (FIG. 4) such as a vehicle body panel as a plate-shaped subject member.

Figure 1:
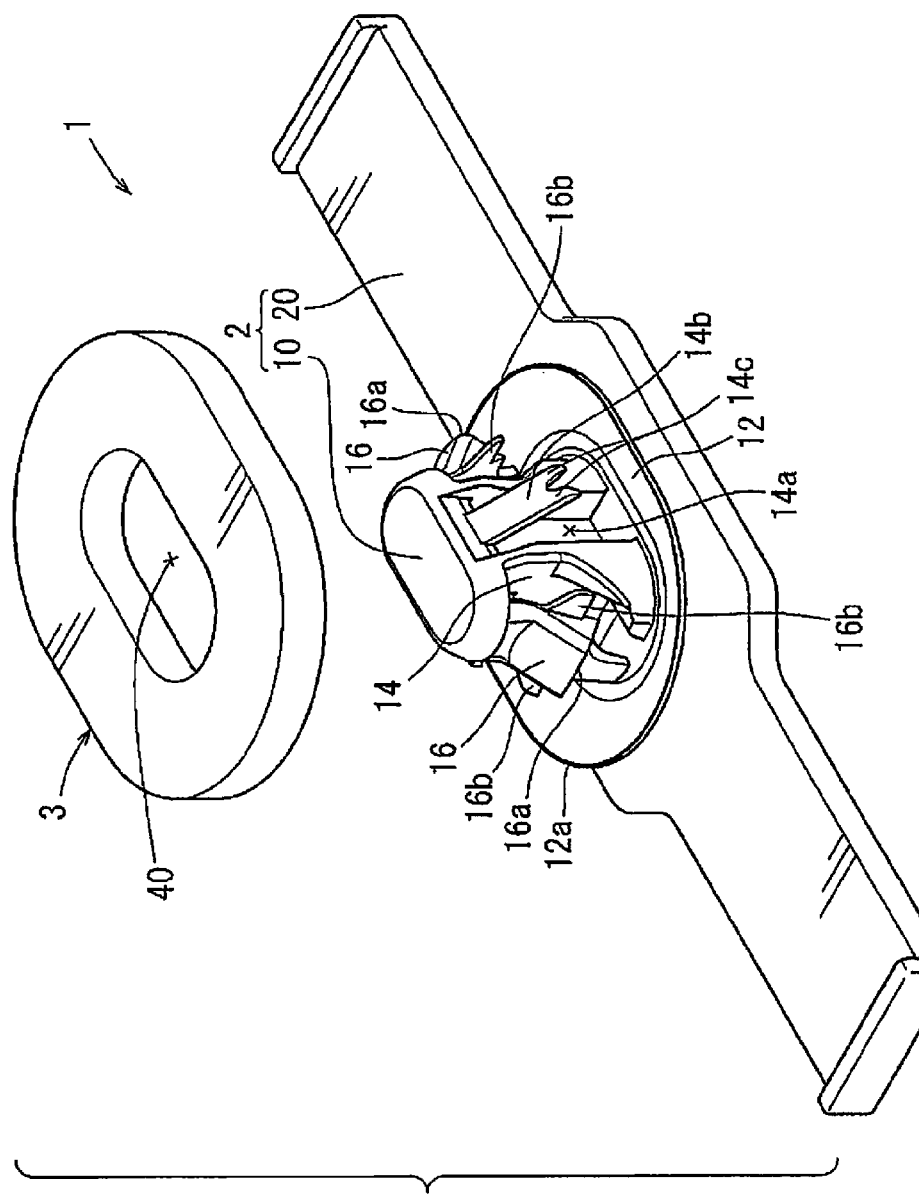
FIG. 1 is a perspective view of a packing and a watertight clip body that constitute a watertight clip according to a representative embodiment of the present invention.

As shown in FIG. 1, the clip 1 may be composed of an integrally formed watertight clip body 2 (which will be hereinafter simply referred to as a clip body 2) made of rigid synthetic resin and a packing 3 made of water repellent urethane. The clip body 2 may be composed of an anchor 10 and an attached article retainer portion 20 to which the wiring harness W is attached. The anchor 10 may be composed of an elliptical dish-shaped stabilizer 12, a substantially rectangular-shaped pillar 14 extending from the stabilizer 12, and a pair of cantilevered elastic engagement legs 16. As will be recognized, the anchor 10 may be configured such that the pillar 14 can be inserted into an attaching hole 32 (FIG. 4) formed in the thin plate 30 while the engagement legs 16 are flexed inward by contacting a circumferential periphery of the attaching hole 32.

The stabilizer 12 may have an annular elastic portion 12a that is formed in a circumferential periphery thereof. The pillar 14 may have an elliptical head portion formed in a distal end thereof. Further, the pillar 14 may be connected to a substantially central portion of the stabilizer 12 at a proximal end thereof. In other words, the stabilizer 12 may be integrally connected to the proximal end of the pillar 14 so as to surround the proximal end of the pillar 14. The engagement legs 16 may respectively be formed in opposite short sides of the pillar 14. The engagement legs 16 may respectively be oppositely projected downward and outward from a distal end of the pillar 14, so as to be oppositely flexed inward and outward with respect to the pillar 14. The attached article retainer portion 20 may be integrated with the stabilizer 12.

Figure 4:
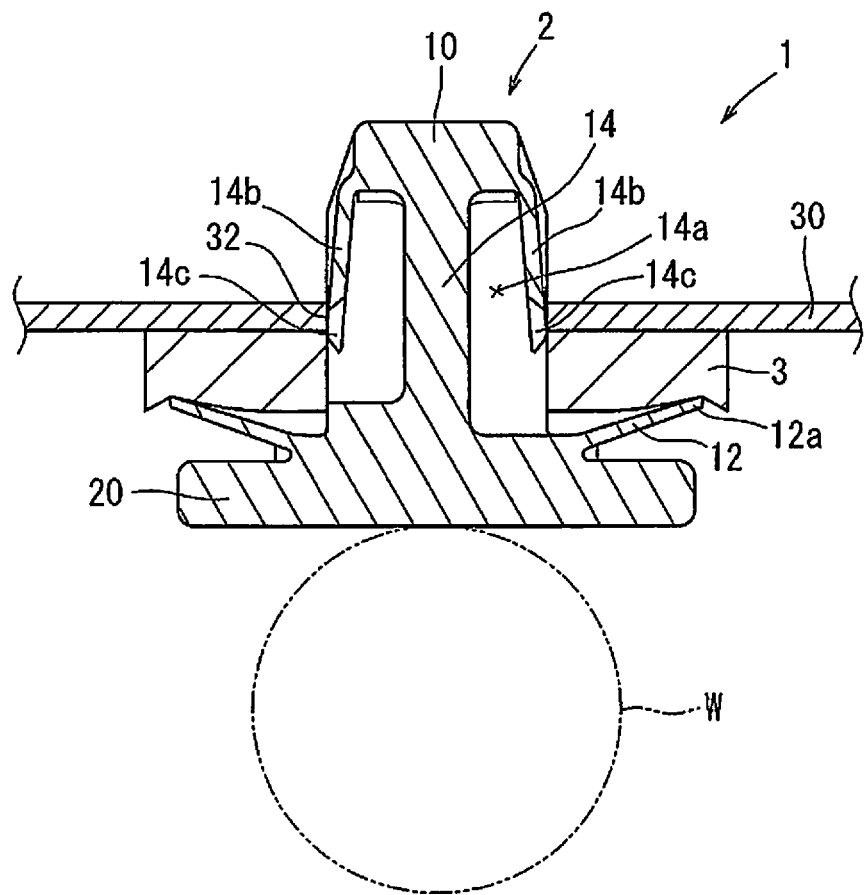
FIG. 4 is a transverse cross-sectional view of the watertight clip shown in FIG. 2, which illustrates a condition in which the watertight clip is attached to the thin plate.
Figure 5:
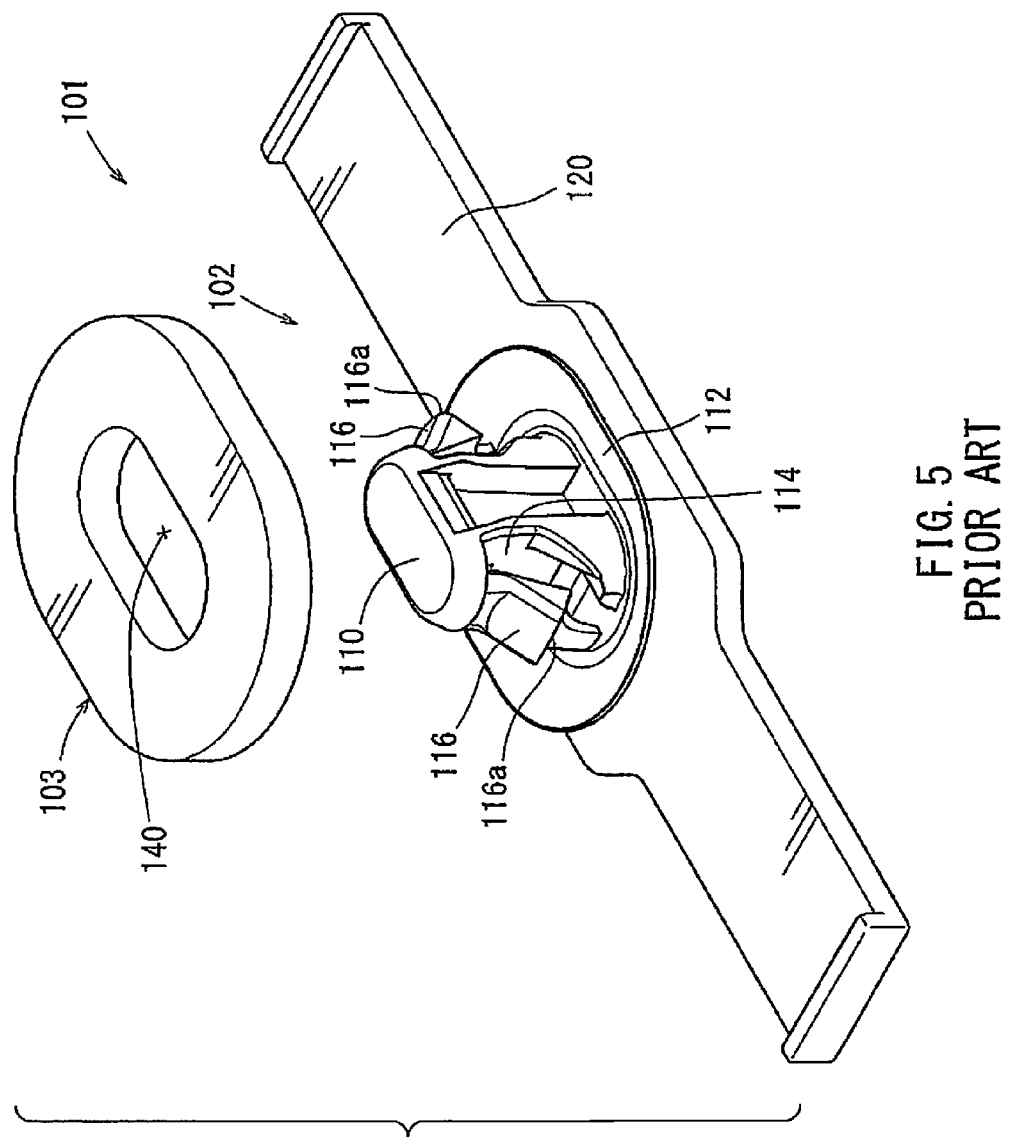
FIG. 5 is a perspective view of a packing and a watertight clip body that constitute a conventional watertight clip.
Figure 6:
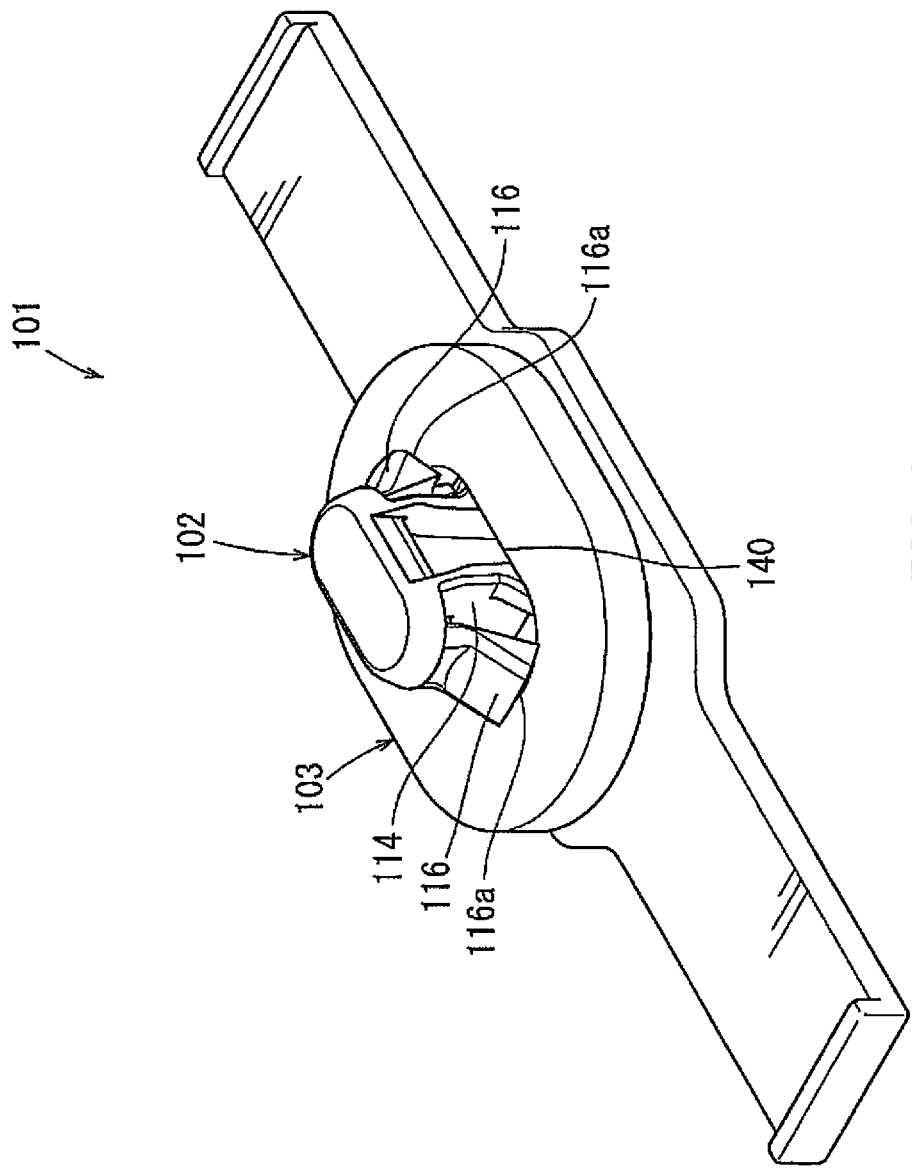
FIG. 6 is a perspective view of the conventional watertight clip that is composed of the packing and the watertight clip body.

The pillar 14 may have depressed portions 14a that are respectively formed in opposite long sides thereof. Further, the pillar 14 may have a pair of cantilevered engagement strips 14b (which may be referred to as a packing retainer member) that are respectively formed in upper end peripheries of the depressed portions 14a. The engagement strips 14b may be oppositely projected downward and outward from the upper end peripheries of the depressed portions 14a, so as to be oppositely flexed inward and outward with respect to the pillar 14. Further, each of the engagement strips 14b may have end acuate projections or claws 14c that are formed in a free end thereof. Further, the engagement strips 14b are respectively configured to be retracted in the depressed portions 14a when they are flexed inward toward the pillar 14 (FIG. 4).

Figure 2:
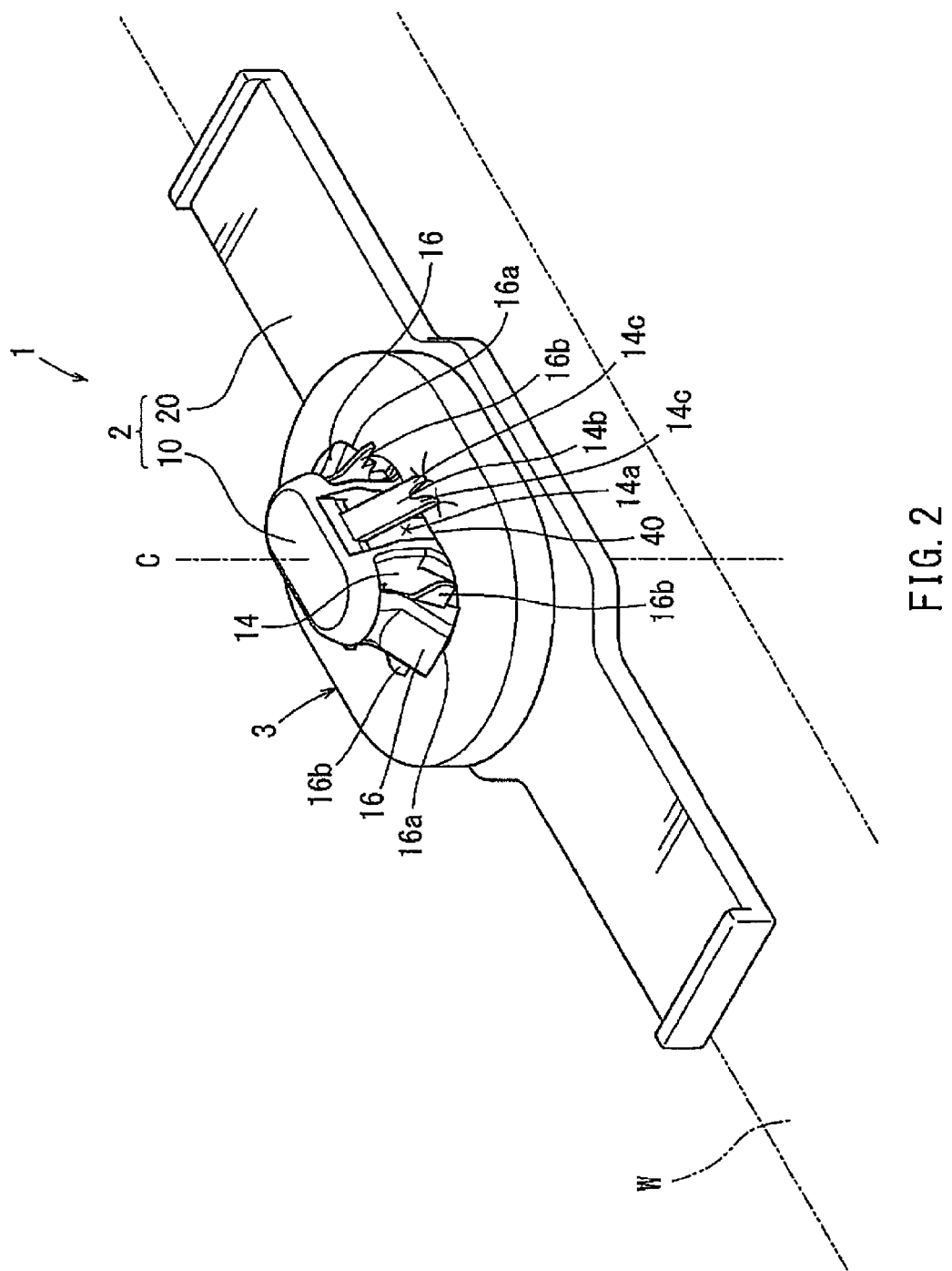
FIG. 2 is a perspective view of the watertight clip that is composed of the packing and the watertight clip body.

As shown in FIGS. 1 and 2, the engagement legs 16 may respectively have inclined stepped end surfaces 16a that are respectively formed in free ends thereof. As will be recognized, the engagement legs 16 may be shaped such that the stepped end surfaces 16a thereof can engage the circumferential periphery of the attaching hole 32 when the pillar 14 is inserted into the attaching hole 32 formed in the thin plate 30. Further, each of the engagement legs 16 may have a pair of fin-shaped ribs 16b (which may be referred to as the packing retainer member) that are respectively formed in opposite sides thereof. The ribs 16b may be oppositely projected from both sides of each of the engagement legs 16 in a lateral direction thereof (i.e., a direction perpendicular to a plane of flexing of each of the engagement legs 16). Further, the ribs 16b may preferably be shaped such that when the pillar 14 is inserted into the attaching hole 32 while the engagement legs 16 are flexed inward, rotational trajectories thereof due to flexing motion of the engagement legs 16 do not interfere with the circumferential periphery of the attaching hole 32.

The attached article retainer portion 20 may preferably be constructed of a rectangular plate-shaped member that can be connected to the wiring harness W using a binding tape (not shown).

Conversely, the packing 3 may preferably have a shape substantially corresponding to the stabilizer 12. Further, the packing 3 may have a through bore 40 that is engageable with the pillar 14 of the anchor 10. As shown in FIG. 2, the packing 3 can be attached to the pillar 14 by inserting the pillar 14 into the through bore 40 of the packing 3, so as to be combined with the clip body 2.

Further, as shown in FIG. 2, the engagement legs 16 may be shaped such that the stepped end surfaces 16a thereof can engage a periphery of the through bore 40 of the packing 3 when the pillar 14 of the anchor 10 is inserted into the through bore 40. Also, the engagement legs 16 may be shaped such that the ribs 16b formed therein can overlap a portion of the packing 3 in a direction of a central axis C of the pillar 14 (the anchor 10) when the packing 3 is attached to the pillar 14. In particular, the engagement legs 16 may be shaped such that the ribs 16b formed therein can engage or contact the packing 3 around the through bore 40 when the packing 3 is attached to the pillar 14. Conversely, the engagement strips 14b may be shaped so as to overlap a portion of the packing 3 in the direction of the central axis C of the pillar 14 when the packing 3 is attached to the pillar 14. In particular, the engagement strips 14b may be shaped such that the claws 14c formed therein can engage or bite into the packing 3 around the through bore 40 when the packing 3 is attached to the pillar 14.

Figure 3:
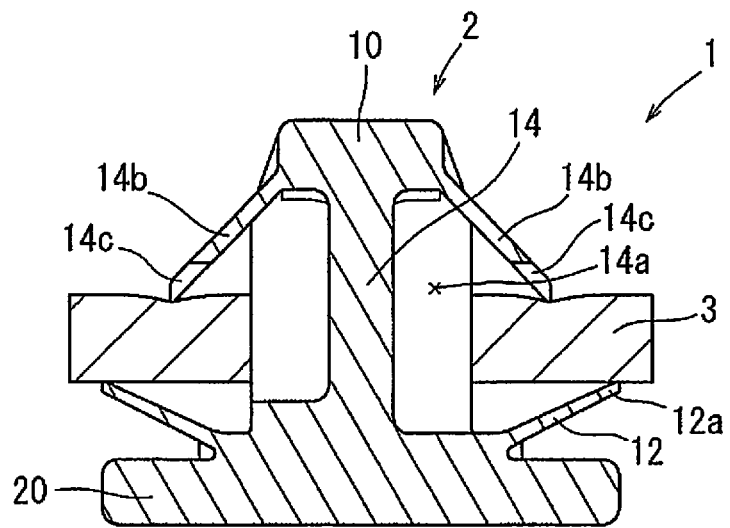
FIG. 3 is a transverse cross-sectional view of the watertight clip shown in FIG. 2, which illustrates a condition in which the watertight clip is not yet attached to a thin plate.

In order to attach the wiring harness W to the thin plate 30, as shown in FIGS. 2 and 3, the pillar 14 of the anchor 10 is introduced into the through bore 40 of the packing 3 while expanding the through bore 40 by the engagement legs 16 until the stepped end surfaces 16a of the engagement legs 16 engages the periphery of the through bore 40. Thus, the packing 3 is combined with the clip body 2 while the packing 3 is seated on the stabilizer 12, so that the clip 1 composed of the clip body 2 and packing 3 can be formed. At this time, as shown in FIG. 2, the ribs 16b formed in the engagement legs 16 may contact the packing 3 around the through bore 40. In addition, as shown in FIGS. 2 and 3, the claws 14c formed in the engagement strips 14b may bite into the packing 3 around the through bore 40. Thereafter, the wiring harness W is connected to the attached article retainer portion 20 of the clip body 2 using the binding tape, so that the clip 1 can be integrated with the wiring harness W.

Subsequently, as shown in FIG. 4, the pillar 14 of the anchor 10 is pushed into the attaching hole 32 formed in the thin plate 30. When the pillar 14 is inserted into the attaching hole 32, the engagement legs 16 can be introduced into the attaching hole 32 with the pillar 14 while being respectively oppositely flexed toward the central axis C of the anchor 10 (the pillar 14). When the pillar 14 is further inserted into the attaching hole 32, the stepped end surfaces 16a of the engagement legs 16 may respectively engage the periphery of the attaching hole 32 while the thin plate 30 is positioned between the stepped end surfaces 16a of the engagement legs 16 and the stabilizer 12. Thus, the clip 1 (the clip body 2 and the packing 3) can be connected to the thin plate 30. As a result, the wiring harness W may be attached to the thin plate 30 via the clip 1. Further, as described above, the packing 3 is attached to the anchor 10 while it is seated on the stabilizer 12. Therefore, when the clip 1 is connected to the thin plate 30, the packing 3 can be interleaved between the thin plate 30 and the stabilizer 12.

When the stepped end surfaces 16a of the engagement legs 16 engage the periphery of the attaching hole 32, the packing 3 can be compressed between the thin plate 30 and the stabilizer 12 (FIG. 4). As a result, when the clip 1 is attached to the thin plate 30, the attaching hole 32 of the thin plate 30 can be sealed or closed with water-tightness by the packing 3. That is, the clip 1 (the packing 3) may create a watertight seal around the attaching hole 32 of the thin plate 30. Thus, the clip 1 (the packing 3) may perform a watertight function around the attaching hole 32. Therefore, in a condition in which the wiring harness W is attached to the thin plate 30 using the clip 1, water (rainwater), dust or other such material can be prevented from entering an interior side of the thin plate 30 through the attaching hole 32.

Further, as shown in FIG. 4, when the pillar 14 is inserted into the attaching hole 32 (i.e., when the clip 1 is attached to the thin plate 30 while the packing 3 is interleaved between the thin plate 30 and the stabilizer 12), the engagement strips 14b may respectively be flexed inward by contacting the periphery of the attaching hole 32, so as to be retracted in the depressed portions 14a formed in the pillar 14. Therefore, when the clip 1 is attached to the thin plate 30, the watertight function of the packing 3 cannot be inhibited by the engagement strips 14b.

Further, as described above, when the pillar 14 is inserted into the attaching hole 32 while flexing the engagement legs 16 inward, the rotational trajectories of the ribs 16b caused by the flexing motion of the engagement legs 16 may not interfere with the circumferential periphery of the attaching hole 32. Therefore, an insertion load of the pillar 14 into the attaching hole 32 cannot be increased.

Further, according to the embodiment, when the packing 3 is combined with the clip body 2 to form the clip 1, the stepped end surfaces 16a of the engagement legs 16 may engage the periphery of the through bore 40. Further, the ribs 16b formed in the engagement legs 16 may contact the packing 3 around the through bore 40. In addition, the claws 14c formed in the engagement strips 14b may bite into the packing 3 around the through bore 40. Therefore, the packing 3 can be effectively prevented from easily separating from or coming off of the pillar 14 of the anchor 10 even when an external force is applied thereto in a direction in which the packing 3 is pulled out of the pillar 14 before the clip 1 is used. Therefore, the packing 3 can be effectively prevented from being detached from the clip body 2 before the clip 1 is used.

Naturally, various changes and modifications may be made to the present invention without departing from the scope of the invention. For example, in the embodiment, a pair of ribs 16b are formed in each of the engagement legs 16. However, the number of the ribs 16b can be changed as necessary. Further, in the embodiment, the attached article retainer portion 20 is constructed of the rectangular plate-shaped member that can be connected to the wiring harness W using the binding tape. However, the attached article retainer portion 20 can be changed depending on types of the attached member. For example, the attached article retainer portion 20 may be a belt clamp or other such members.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A watertight clip, comprising:
    a watertight clip main body having a stabilizer, a pillar extending axially from the stabilizer, engagement legs formed in the pillar, and engagement strips formed in the pillar, and
    a compressible packing attached to the pillar, the packing being seated on the stabilizer,
    wherein an end of each of the engagement strips is configured to engage a portion of the packing at a surface of the packing facing away from the stabilizer and exert an axial retaining force on the packing causing the portion of the packing to be compressed,
    wherein the pillar has depressed portions that are configured such that the engagement strips flexed inward are received therein, and
    wherein the engagement strips are configured to be retracted in the depressed portions when the watertight clip is in use.

2. The watertight clip as defined in claim 1, wherein the engagement legs have ribs formed therein, and wherein the ribs are configured to engage the packing and exert an axial retaining force on the packing.

3. A watertight clip, comprising:
    a watertight clip main body having a stabilizer, a pillar extending from the stabilizer, engagement legs formed in the pillar, and engagement strips formed in the pillar, and a compressible packing attached to the pillar, the packing being seated on the stabilizer, wherein the engagement strips are configured to exert an axial retaining force on the packing causing a portion of the packing to be compressed and configured to be flexed inward from an outward position with respect to the pillar, wherein the pillar has depressed portions that are configured such that the engagement strips flexed inward are received therein, and wherein the engagement strips are configured to be retracted in the depressed portions when the watertight clip is in use.

4. The watertight clip as defined in claim 3, wherein the engagement strips are configured to engage the packing and exert an axial retaining force on the packing when in the outward position.

5. The watertight clip as defined in claim 3, wherein the engagement legs have ribs formed therein, and wherein the ribs are configured to engage the packing and exert an axial retaining force on the packing.

6. The watertight clip as defined in claim 3, wherein the depressed portions are configured such that end portions of each of the engagement strips received therein engage an inside surface of the packing, the inside surface defining a through bore of the packing.

7. A watertight clip, comprising:

a watertight clip main body having a stabilizer, a pillar extending from the stabilizer, engagement legs formed in the pillar, and engagement strips formed in the pillar, and a compressible packing attached to the pillar, the packing being seated on the stabilizer, wherein each of the engagement strips is configured to exert an axial retaining force on the packing causing a portion of the packing to be compressed and has acute projections that are formed in an end thereof so as to be projected toward the packing, and wherein the pillar has depressed portions that are configured such that the engagement strips flexed inward are received therein.

* * * * *